Sept. 3, 1929.   F. G. DIAGO   1,727,275
AIRPLANE STABILIZER
Filed Aug. 25, 1926   4 Sheets-Sheet 1

WITNESSES

INVENTOR
F. G. Diago,
BY
ATTORNEYS

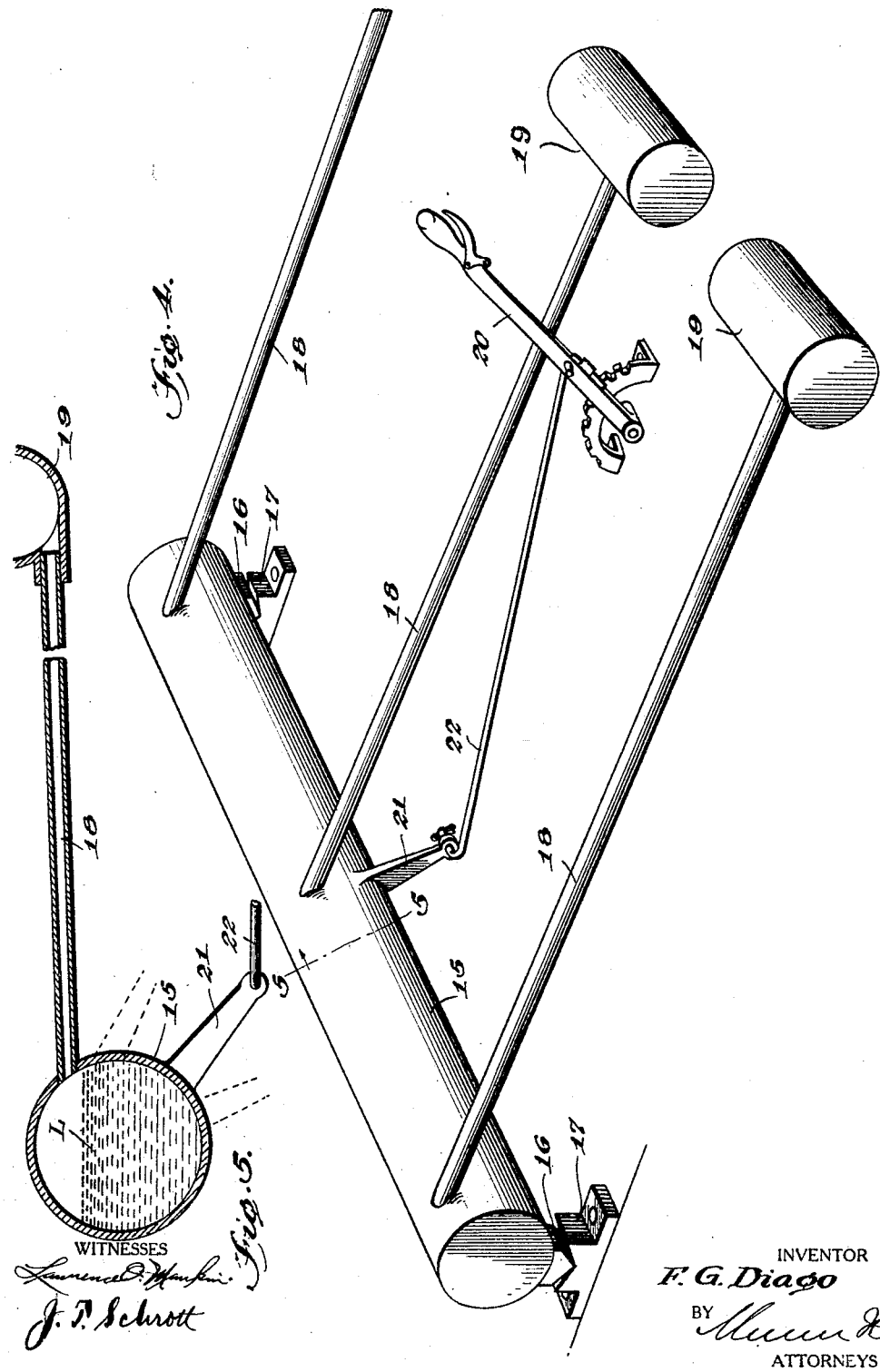

Sept. 3, 1929.  F. G. DIAGO  1,727,275
AIRPLANE STABILIZER
Filed Aug. 25, 1926  4 Sheets-Sheet 3
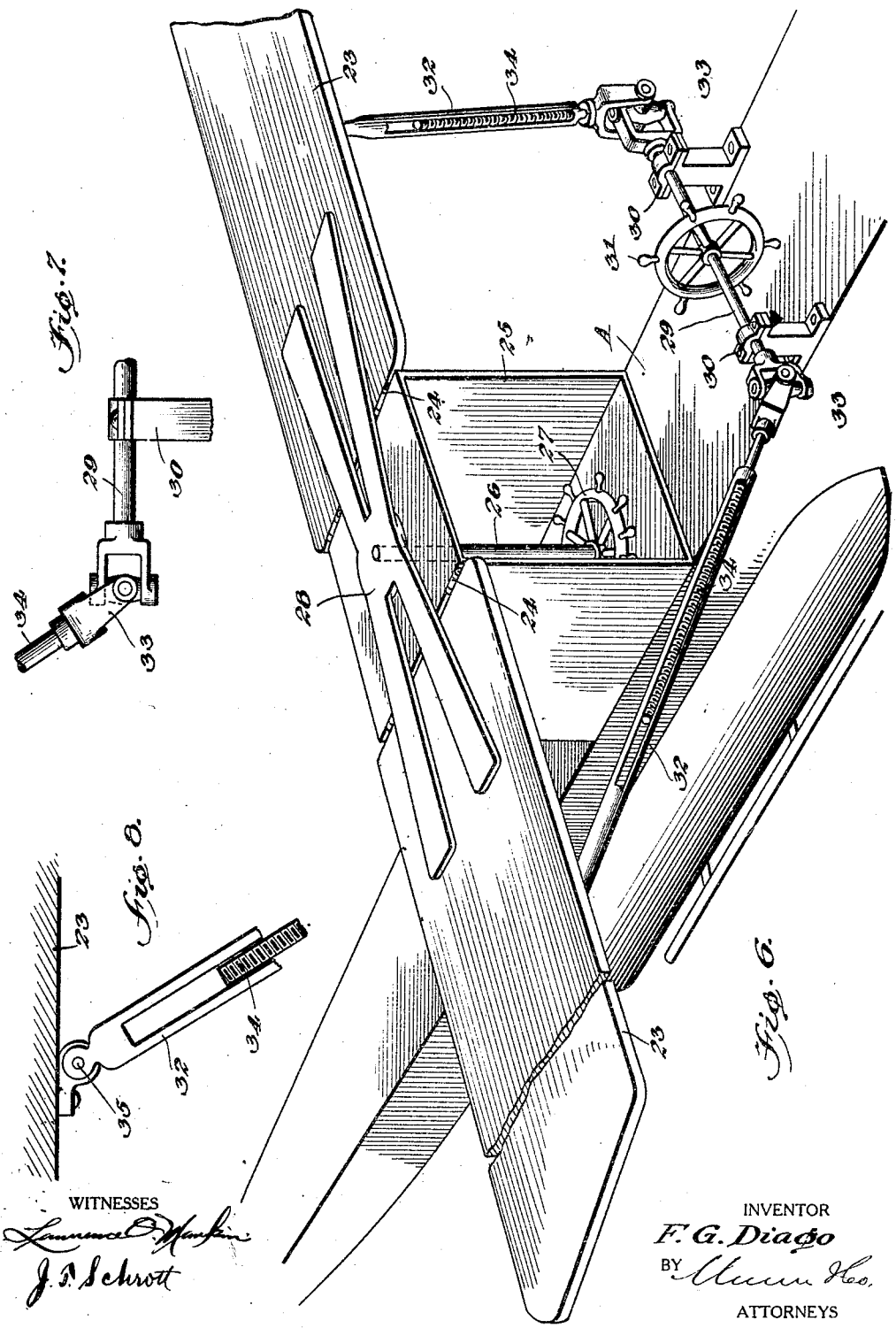
WITNESSES
INVENTOR
F. G. Diago
BY
ATTORNEYS

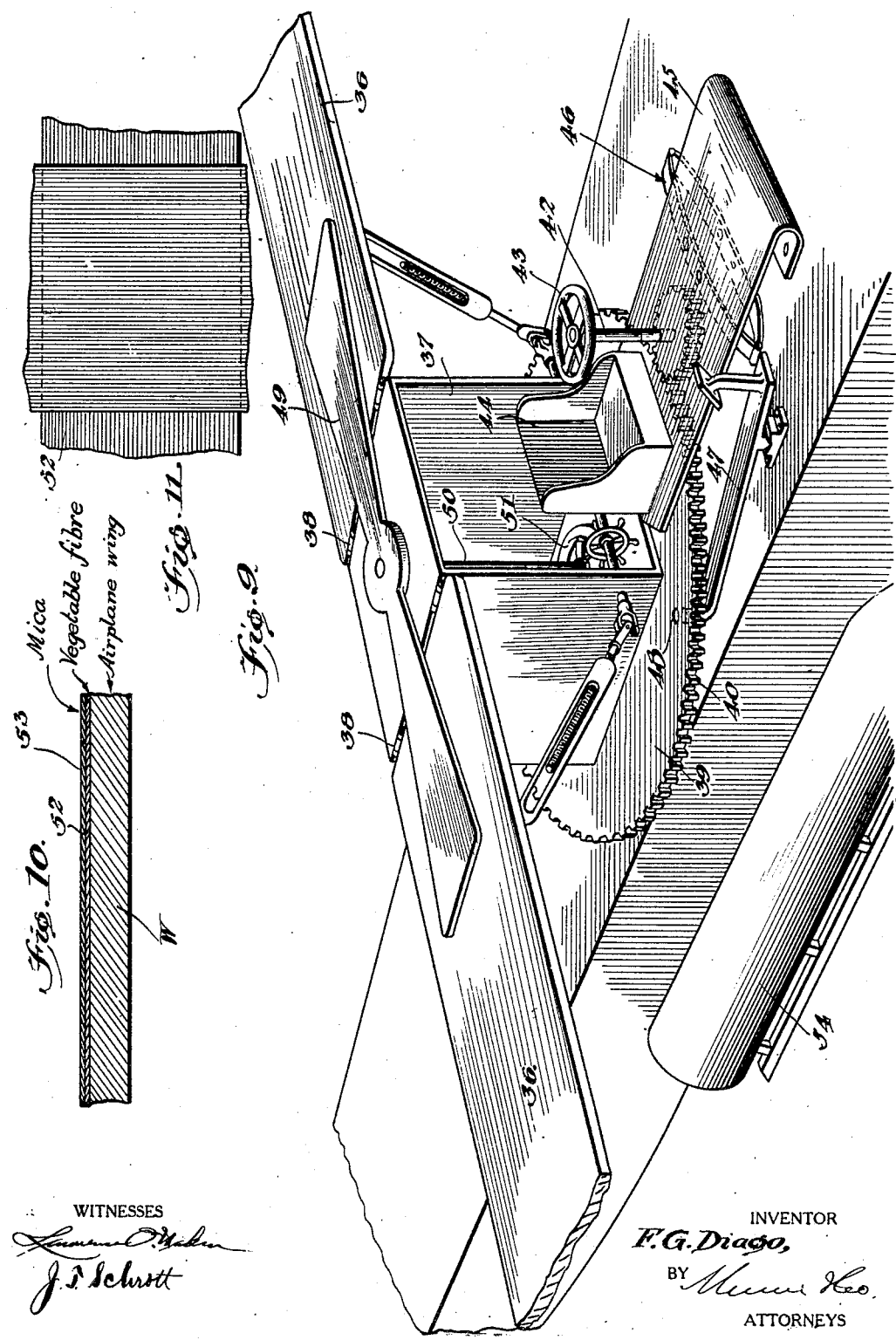

Patented Sept. 3, 1929.

1,727,275

UNITED STATES PATENT OFFICE.

FEDERICO G. DIAGO, OF HABANA, CUBA.

AIRPLANE STABILIZER.

Application filed August 25, 1926. Serial No. 131,473.

This invention relates to improvements in aircraft being directed particularly to the heavier-than-air type known as air planes, an object being to provide means by which the airplane can be stabilized while in flight should the equilibrium thereof be disturbed by any of a number of influences to which such apparatus is subjected.

Other objects and advantages appear in the following specification, reference being had to the accompanying drawing, in which Figure 1 is a side elevation of an airplane, a portion of the fuselage being broken away to reveal the mechanism on the inside by which the stabilizing means is controlled.

Figure 2 is a detail cross section,

Figure 3 is a detail perspective view showing the stabilizing means separated from the fuselage, Figure 4 is a perspective view of the first modification adapted for using a flowing ballast, Figure 5 is a detail cross section taken on the line 5—5 of Figure 4, Figure 6 is a perspective view of a portion of an airplane having a second modification embodied therein, this being means for folding the wings, Figure 7 is a detail view of one of the universal joints employed, Figure 8 is a detail view showing the connection of one of the adjustable rods with the adjacent airplane wing, Figure 9 is a perspective view of a third modification employing a turntable for revolving the wing carrier in respect to the fuselage.

Figure 10 is a detail sectional view of a portion of an airplane wing illustrating an improved covering hereinafter described.

Figure 11 is a detail view illustrating how the layers of vegetable fibers are arranged.

The several modifications herein disclosed are each for the purpose of so controlling or handling an airplane as to obtain the best performance possible. The arrangements in Figures 1 to 5 inclusive provide for the shifting of ballast in order to stabilize the airplane in case the equilibrium thereof has been upset by some outside influence. Both modifications in Figures 6 and 9 make provision for folding the wings of the airplane, but in the latter instance the wings can be turned in respect to the fuselage when raised and folded to act as sails to propel the airplane over the ice.

Figure 1:
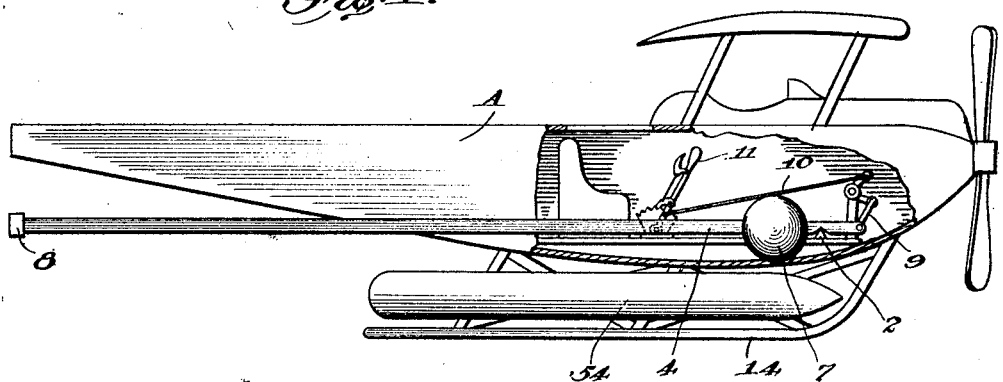
Figure 2:
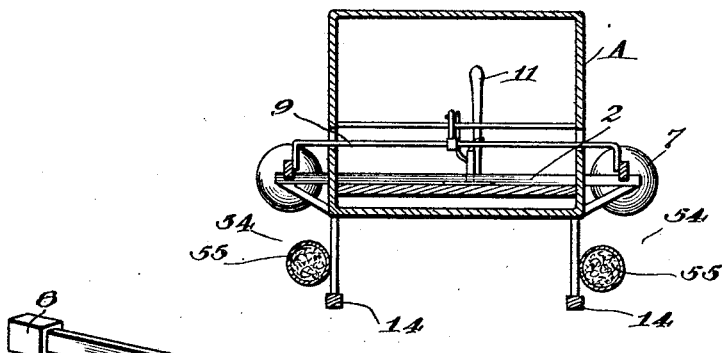
Figure 3:
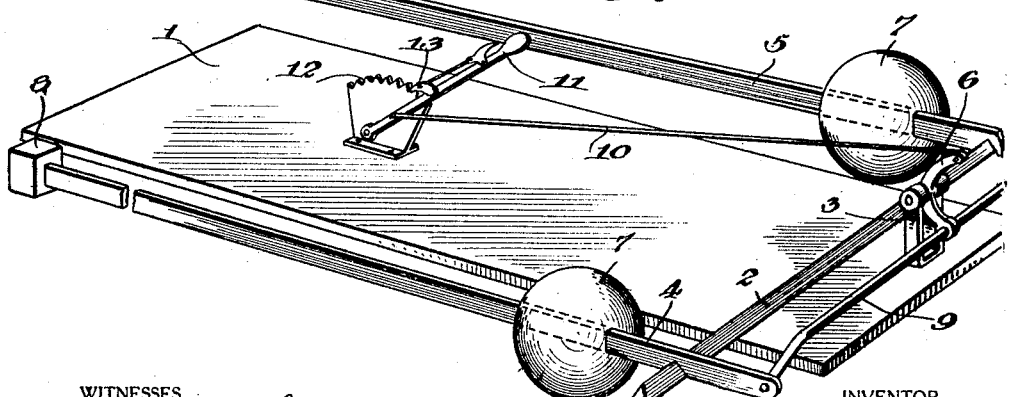

The modification in Figure 1 illustrates the use of an airplane A the fuselage of which contains a platform 1 which carries both a knife-edge bar 2 and a bearing 3. The former provides the fulcrum for a pair of levers 4 and 5, the latter providing the pivotal support for a crescent shaped lever 6.

Weights 7 are slidably mounted upon the lever 4 and 5, these being capable of moving along the levers between the fulcrum bar 2 and suitable stops 8 on the extremities of the levers. The weights are carried by the long ends of the levers. The short ends have pivotal connection with a reach rod 9 (Fig. 3) which extends from side to side, and in the middle has connection with the lower end of the lever 6.

The upper end of the lever 6 is joined by means of a rod 10 with the operating handle 11. The handle has pivotal mounting upon the platform 1, and in order that the adjustment thereof may be held, is provided with any known form of quadrant 12 and detent 13.

The airplane A is preferably mounted upon skids 14 (Fig. 1). The platform 1 is situated inside of the fuselage, but the ends of the knife-edge bar 2 extend outside of the fuselage (Fig. 2) in order to support the levers 4 and 5 which are preferably mounted on the outside also. It is evident that bolting the handle 11 in the appropriate direction will cause either a raising or lowering of the extremities of the long ends 4 and 5 of the pair of levers so that the weights 7 slide either forward or backward thereby to stabilize the airplane. In practice, these weights are more or less heavy in proportion to the dead weight of the airplane so that the function thereof will be most effective.

The modification in Figures 4 and 5 is the same in principle as the first modification, although the structure involved is different. Use is now made of flowing ballast in other words ballast that is more readily movable from point to point than are the foregoing weights. Quicksilver, water and other liquids of various kinds, sand, gravel and the like are but illustrations of what is meant by flowing ballast.

A large tank 15 has knife-edge bearings 16 which rest upon supports 17 suitably mounted upon the framework of the airplane. The framework is not shown in Figure 4 but such framework is to be regarded as of any ordinary kind for example as shown in Figure 1. The tank 15 constitutes the main reservoir of the flowing ballast which for the purpose of illustration may be regarded as consisting of a liquid L (Fig. 5). A plurality of pipes 18 extend from the reservoir 15 and communicate with auxiliary tanks 19 mounted upon the extremities. The auxiliary tanks may be mounted in any suitable manner and it is deemed an obvious expedient to suitably brace the pipes 18 by any known means should bracing be found necessary. A handle 20 has connection with an arm 21 on the reservoir 15 by means of a rod 22.

Ordinarily when the airplane is in proper equilibrium the level of the liquid L will stand in the reservoir 15 about as shown in Figure 5. The pipes 18 are situated slightly above the liquid level and have a slight upward inclination to insure drainage of the liquid from the auxiliary tanks 19. Should it be necessary to stabilize the airplane a movement of the handle 20 in the appropriate direction will rock the reservoir 15 upon its bearings tilting the pipes 18 downwardly so that liquid may flow into the auxiliary tanks 19. When the need for stabilization is over the return of the handle 20 will return the reservoir 15 to the original position whereupon the liquid will flow back.

The modification in Figure 6 discloses an arrangement for raising the wings 23 of the airplane A, although the arrangement may provide for lowering the wings should it be so desired. The adjacent short edges of the wings are pivoted or hinged as at 24 to a structure known as the wing carrier 25, which in this case is fixedly mounted upon the fuselage.

A shaft 26, suitably journaled upon the carrier 25 carries a hand wheel 27 at the lower end and a wing rest 28 at the upper end. The wing rest is composed of a pair of fork-like members which may be made to either assume positions over the wings 23 or positions at right angles upon appropriately turning the hand wheel 27.

A control shaft 29, mounted in bearings 30 in front of the operator, carries a hand wheel 31 accessible to the operator for the purpose of raising the wings 23 into an upwardly extended position. For this purpose the wings are connected through adjustable rods 32 with universal joints 33 at the ends of the control shafts. The rods are made in two sections, the section 34 being threaded and screwed into the remaining section which is hinged at 25 (Fig. 8) to the airplane wings.

When the occasion so demands, the airplane pilot will set the stabilizer, turn the hand wheel 27 and wing rest 28 through an arc of 90°, then turn the hand wheel 31 in the proper direction until the wings 23 are raised the desired distance. The stabilizer mentioned may consist of either arrangement in Figures 1 and 4, the stabilizer being omitted in Figure 6 because it is regarded unnecessary to duplicate the illustration. The provision for raising the wings 23 is of great convenience when desiring to maneuver the airplane in close quarters.

The modification in Figure 9 discloses an arrangement by which the wings 36 of the airplane can be made to serve as sails for propelling the airplane across frozen rivers, lakes, desert sands, etc. For these purposes the fuselage is equipped with runners or skids. The turret or wing carrier 37 to which the wings are hinged as at 38 is mounted upon a turntable 39. The turntable has a gear face 40 extending around as far as desired, there being a pinion 44 on the shaft 42 of a steering wheel 43 by which the turntable may be revolved in one or the other direction, and when thus revolved it follows that the wings 36 will change position in respect to the airplane fuselage.

The pilot's seat 44 is mounted upon a board or platform 45, fixedly supported at the forward end upon the fuselage of the air plane and at the rear end extending slightly over the edge of the turntable 39. A suitable spring 46 assists in supporting the platform. In practice the arrangement must be such that the seat 41 will not interfere with the turning of the carrier 37. A latch 47 provides for locking the turntable 39 in position when the wings 36 are extended at right angles to the fuselage, the turntable having an opening 48 with which the latch is then intended to engage. A rest 49 serves the same purpose as the rest 28 in Figure 6, being carried by a shaft 50 which is revoluble by a hand wheel 51 accessible to the operator. An arrangement similar to that shown in Figure 6 is employed for raising and lowering the wings, the duplication of the description being regarded as unnecessary.

Supposing it to be desired to propel the airplane over a surface such as that of a frozen river or the like, the pilot has but to turn the rest 49 into position where it will not interfere with the raising of the wings 36. The wings 36 are then raised by means of the arrangement shown then turned into the desired position by the hand or steering wheel 43. The force of the wind against the raised wings drives the airplane forwardly, the wings acting as sails. By properly maneuvering the wheel 40 the airplane can be steered as desired.

It is anticipated that a great deal of damage can be done to the wings of an airplane by the impact of hail and by the battering and ramming of icicles during a blizzard. It is proposed to provide a novel covering for the airplane wings, such covering also being adaptable to the gas bags of dirigible balloons. According to Figure 10 one side of the wing W, which may be regarded as the wing of any of the foregoing modifications, is provided with a layer 52 of vegetable fiber, preferably such as is obtained from the stalks of the royal palm tree leaves. Placed on top of the foregoing fiber layer is a covering of mica 53 which gives the wing not only a smooth and glazed appearance but also renders it fire and weather proof.

The layer 52 is two-ply as in Figure 11, the fibers running in opposite directions to make a strong structure. The whole is then suitably secured together into a single sheet, and applied where needed. If so desired the mica can be dispensed with, and the protection confined to the fiber layers 52 which are then preferably weather proofed and fire proofed by any known means.

Inasmuch as the airplane is designed to sail upon the surface of the water when forced to alight, provision is made of floats 54 which provide the required buoyancy. These are composed of leather or other suitable coverings filled with granulated cork 55. Piercing the coverings would not destroy the effectiveness of the floats as would be the case were they filled with air. The floats are preferably attached to the skids 14, or in some other appropriate place.

While the construction and arrangement of the improved airplane stabilizer is that of a generally preferred form, obviously modifications and changes may be made without departing from the spirit of the invention or the scope of the claims.

I claim:—

1. In combination with the fuselage of an airplane, wings for the airplane capable of assuming an extended position, hinges by which the wings are movable in one of two permissible directions, means permitting moving the wings in one direction, and means movable into position against the wings while extended to prevent an inadvertent movement of the wings in said direction.

2. In combination with the fuselage of an airplane, a carrier supported by the fuselage, wings, hinges by which the wings are attached to the carrier, means for moving the wings upon said hinges to shift them in position relative to the carrier, and means supported by the carrier being movable into position against the wings when extended to serve as rests therefor.

3. In combination with the fuselage of an airplane, a carrier mounted upon the fuselage, wings, hinges by which the wings are attached to the carrier, a control shaft having a hand wheel for manual operation, adjustable rods pivotally connected at one end with the wings, and universal joints connecting the opposite ends of the rods with the control shaft for extending the adjustable rods and causing swinging of the wings upon said hinges.

4. In combination with the fuselage of an airplane, wings, a carrier, hinges by which the wings are attached to the carrier, a turntable mounted upon the fuselage and supporting the carrier, means for opening and closing the wings, and means for revolving the turntable when said wings are closed permitting the wings to act as sails.

5. In combination with the fuselage of an airplane, wings, a carrier, hinges by which the wings are attached to the carrier, a turntable mounted upon the fuselage and supporting the carrier, means for opening and closing the wings, means for revolving the turntable when said wings are closed permitting the wings to act as sails, and means carried by the fuselage for engaging the turntable and locking it in a predetermined position in respect to the fuselage.

6. An airplane comprising a fuselage having skids, floats attached to the skids, wings, a carrier upon which the wings are hingedly mounted, means to move the carrier into any angular position in reference to the fuselage, and means to raise the wings into erect position to act as sails when the airplane is supported either upon the skids or floats.

7. An airplane comprising a fuselage, a turntable upon the fuselage having a peripheral gear, a carrier mounted on the turntable, wings having hinges by which they are attached to the carrier, a control shaft mounted upon the carrier having means connected with the wings for rocking the wings on the hinges when the control shaft is turned thus to obtain various adjustments of the wings relative to the fuselage, and a shaft having a steering wheel and a pinion in mesh with said gear permitting turning of the turntable regardless of the adjustments of the wings.

8. An airplane comprising a fuselage, a turntable mounted upon the fuselage and having a periperal gear, wings, a carrier to which the wings are attached being mounted on the turntable, a shaft having a steering wheel and a pinion in mesh with said gear permitting turning the turntable and the assembly thereupon, a platform upon which the shaft has support, being mounted upon the fuselage and extending over the turntable, and a seat upon that part of the platform which extends over the turntable being conveniently accessible to the steering wheel.

FEDERICO GUILLERMO DIAGO.